(12) United States Patent
Seeley

(10) Patent No.: US 8,665,598 B2
(45) Date of Patent: Mar. 4, 2014

(54) PLANAR INFORMATION DEVICE

(75) Inventor: Ross John Douglas Seeley, Markham (CA)

(73) Assignee: 2082053 Ontario Limited, Markham, ON (CA)

( * ) Notice: Subject to any disclaimer, the term of this patent is extended or adjusted under 35 U.S.C. 154(b) by 408 days.

(21) Appl. No.: 13/085,090

(22) Filed: Apr. 12, 2011

(65) Prior Publication Data

US 2011/0292588 A1   Dec. 1, 2011

(30) Foreign Application Priority Data

May 25, 2010   (CA) ...................................... 2704784

(51) Int. Cl.
*H05K 7/00*   (2006.01)

(52) U.S. Cl.
USPC .......................................... 361/729; 361/737

(58) Field of Classification Search
USPC .................... 361/727, 737, 756, 801–803
See application file for complete search history.

(56) References Cited

U.S. PATENT DOCUMENTS

| | | | | |
|---|---|---|---|---|
| 5,155,663 A | * | 10/1992 | Harase | 361/679.31 |
| 6,356,456 B2 | * | 3/2002 | Eskildsen | 361/801 |
| 6,457,647 B1 | * | 10/2002 | Kurihashi et al. | 235/486 |
| 6,761,313 B2 | * | 7/2004 | Hsieh et al. | 235/451 |
| D558,199 S | * | 12/2007 | Fiorentino | D14/436 |
| 7,762,849 B2 | * | 7/2010 | Hubert et al. | 439/630 |

\* cited by examiner

*Primary Examiner* — Hung S Bui
(74) *Attorney, Agent, or Firm* — Perry + Currier

(57) ABSTRACT

An substantially planar information device is provided comprising: a memory module including a memory device and an electrical interface to connect the memory device to a complementary interface of a computing device; and a housing including a recess in which the memory module can be removably received, a receptacle to receive the electrical interface when the memory module is received in the recess, wherein the memory module and the housing are substantially planar such that the information device can be affixed to a planar substrate without substantially changing the profile of the planar substrate.

16 Claims, 26 Drawing Sheets

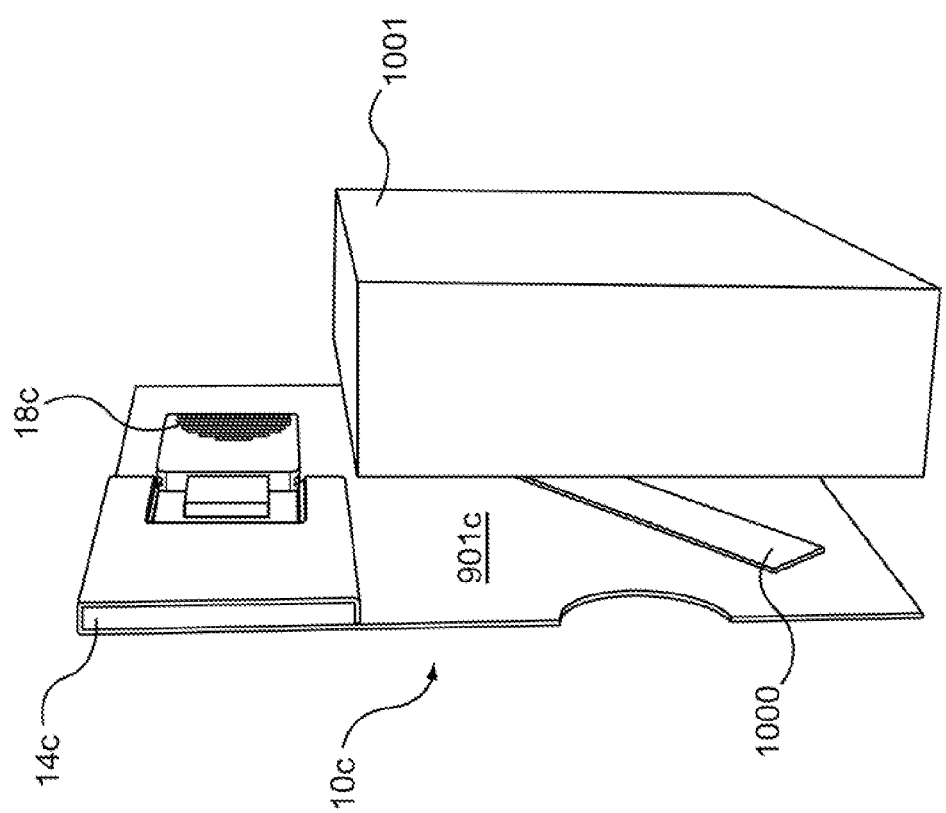

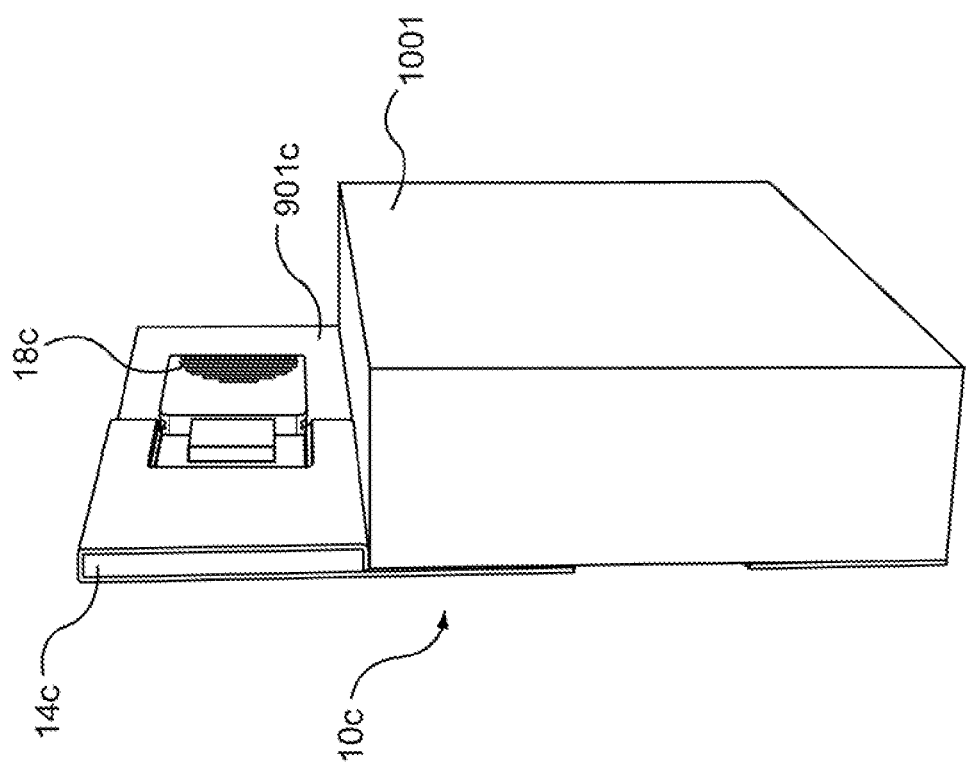

PLANAR INFORMATION DEVICE

CROSS-REFERENCE TO RELATED APPLICATIONS

The present application claims priority from Canadian Patent Application No. 2704784 filed on May 25, 2010, and incorporated herein by reference.

FIELD

The present invention relates to information devices. More specifically, the present invention relates to an electronic information device which can be affixed to a planar substrate without substantially changing the profile of the planar substrate.

BACKGROUND

Over the past decade, conventional marketing methods have evolved to make increasing use of the Internet, and in particular, on marketing materials presented on web sites. Printed materials, such as brochures and advertisements in publications typically now include a URL which the recipient of the material can enter in their web browser to access the marketer's web site which provides additional marketing materials and information.

While such combined print and web URL-based marketing efforts provide numerous advantages, they still suffer from disadvantages. For example, the user must read the URL from the printed materials and correctly enter that URL into their web browser. Problems occur with this often enough that a whole shadow industry has arisen wherein questionable commercial entities buy URL's for common misspellings of important company names and/or trademarks to take advantage of consumers who make such mistakes in entering URLs into their web browsers.

Another disadvantage is that marketers typically have no feedback with respect to the effectiveness of their marketing efforts. While they can tell when their web page is accessed, they do not know what advertisement resulted in the consumer visiting their web site or who the consumer is.

SUMMARY

It is an object of the present invention to provide a novel method, system and device for initiating and tracking web-based marketing which obviates or mitigates at least one disadvantage of the prior art.

According to a first aspect of the present invention, there is provided an information device for use with a computing device, comprising: a memory module including a memory device and an electrical interface to connect the memory device to a complementary interface of a computing device; and a housing including a recess in which the memory module can be removably received and a receptacle to receive the electrical interface when the memory module is received in the recess, wherein the memory device includes program steps executed when the memory module is interfaced to the computing device the program steps initiating a web browser session of the computing device and providing a predefined URL to that web browser session to direct the browser session to the predefined URL.

Preferably, the memory device further includes a unique identifier which is supplied to the web site of the predefined URL.

According to another aspect of the present invention, there is provided a method of tracking the activities of a user of an information device, comprising the steps of: (i) programming a memory module in the information device with at least a url for a web site related to a product and a unique identifier for the information device; (ii) associating the unique identifier with a user; (iii) determining when the user employs the information device to access the web site related to the product and the activities of the user with the web site; and (iv) utilizing the information about the activities of the user with the web site to improve marketing of the product.

Preferably, step (iv) comprises providing additional information and/or marketing material to the user. Also preferably, the method further comprises the step of accumulating a record of the activities with the web site of a plurality of users and performing at least a statistical analysis of those activities. Also preferably, step (iv) comprises redesigning the web site to reprioritize information presented to users based upon an analysis of the activities of the plurality of users.

The present invention provides a novel system, method and device for initiating and tracking web-based marketing efforts includes an information device that is provided to potential customers, either in conjunction with printed marketing materials of by itself. The information device includes a memory module which can be interfaced to a computing device of the potential customer. When interfaced to a computing device, the memory module invokes a web browser session on the computing device and supplies a URL to the invoked web browser session, directing the session to a web site relating to the marketing effort. In a preferred embodiment of the invention, the memory module further includes a unique identifier which can be used to track the potential customer's activities on the web site.

Another aspect of the specification provided an information device for use with a computing device, comprising: a memory module including a memory device and an electrical interface to connect the memory device to a complementary interface of a computing device; and a housing including a recess in which the memory module can be removably received, a receptacle to receive the electrical interface when the memory module is received in the recess, wherein the memory module and the housing are substantially planar such that the information device can be affixed to a planar substrate without substantially changing the profile of the planar substrate.

The memory module and the housing can each be at least one of: less than about 5 mm thick; and between about 2.5 mm and 8.5 mm thick.

At least one of sides of the recess and complementary sides of the memory module can comprise at least one retaining mechanism for frictionally retaining the memory module in the recess when the electrical interface is received in the receptacle.

The at least one retaining mechanism can comprise at least one boss and at least one complementary depression for receiving the boss. The at least one boss can be on one of the sides of the recess and the complementary sides of the memory module, and the at least one complementary depression can be on the other of the sides of the recess and the complementary sides of the memory module. The recess can be defined by two substantially parallel arms comprising the sides of the recess. The sides of the recess can comprise the at least one boss, and the complementary sides of the memory module can comprise the at least one complimentary depression. Each of the two substantially parallel arms can be enabled to flex away from the recess, as the boss passes along the complementary side of the memory module before being received in the complementary depression.

The at least one retaining mechanism can comprise tracks which engage complementary rails. The at least one retaining mechanism can comprise at least one boss at the complimentary rails and at least one complementary depression for receiving the boss at the tracks.

The information device can further comprise the planar substrate, wherein the housing is affixed to the planar substrate. The planar substrate can be affixed to a container, such that the memory module can be removed from the housing when the planar substrate is affixed to the container.

Yet a further aspect of the specification provides an information device for use with a computing device, comprising: a memory module including a memory device and an electrical interface to connect the memory device to a complementary interface of a computing device; and a housing including a recess in which the memory module can be removably received, a receptacle to receive the electrical interface when the memory module is received in the recess, wherein the memory module and the housing are substantially planar; and a planar substrate, wherein the housing is affixed to the planar substrate, the planar substrate affixable to a container, such that the memory module can be removed from the housing when the planar substrate is affixed to the container.

The planar substrate can comprise printed material on a side opposite the housing, the printed material regarding a product associated with the container. The container can be enabled to contain a pharmaceutical product, and the printed material can comprise information regarding the pharmaceutical product. The printed material can be similar to information printed on a side of the container to which the planar substrate is to be affixed.

The information device of claim can further comprise an adhesive mechanism for affixing the planar substrate to the container. The adhesive mechanism for affixing the planar substrate to the container can comprise at least one of double sided tape, an adhesive, and an adhesive strip.

The memory device can include program steps executed when the memory module is interfaced to the computing device, the program steps initiating a web browser session of the computing device and providing a predefined URL to that web browser session to direct the browser session to the predefined URL. The predefined URL can be associated with a website associated with at least one of a product and a service associated with the container.

The planar substrate can be integral with the container.

Another aspect of the specification provides a product information device, comprising: a planar substrate, comprising: an area for affixing an information device thereto, the information device for use with a computing device, the information device comprising: a memory module including a memory device and an electrical interface to connect the memory device to a complementary interface of a computing device; and a housing including a recess in which the memory module can be removably received, a receptacle to receive the electrical interface when the memory module is received in the recess, wherein the memory module and the housing are substantially planar; a side affixable to a container, such that the memory module can be removed from the housing when the planar substrate is affixed to the container.

The planar substrate can comprise printed material on a side opposite the area for affixing the information device thereto, the printed material regarding a product associated with the container. The container can be enabled to contain a pharmaceutical product, and the printed material can comprise information regarding the pharmaceutical product. The printed material can be similar to information printed on a side of the container to which the planar substrate is to be affixed.

The product information device can further comprise an adhesive mechanism for affixing the planar substrate to the container. The adhesive mechanism for affixing the planar substrate to the container can comprise at least one of double sided tape, an adhesive, and an adhesive strip.

The planar substrate can be integral with the container.

BRIEF DESCRIPTIONS OF THE DRAWINGS

Preferred embodiments of the present invention will now be described, by way of example only, with reference to the attached Figures, wherein:

FIGS. 10 to 12 show perspective views of an information device as it is attached to a container, the information device being in an open position, in accordance with the present invention.

DETAILED DESCRIPTION

Figure 1A:
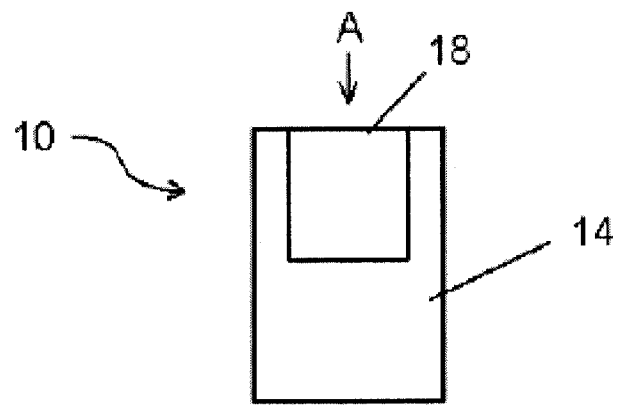
FIGS. 1a and 1b show an information device in accordance with the present invention.
Figure 1B:
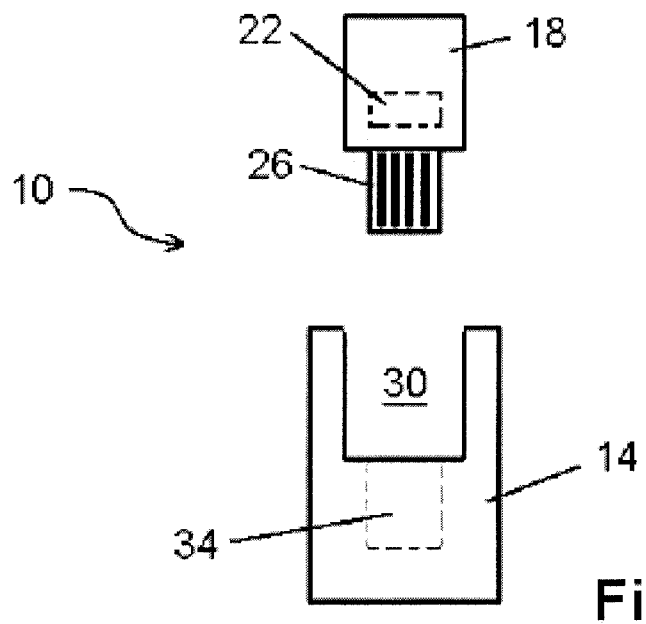

An information device, in accordance with the present invention, is indicated generally at 10 in FIGS. 1a and 1b. Information device 10 includes a housing member 14 and a memory module 18.

Memory module 18 comprises a read only memory device 22 and an electrical interface 26, which in the presently preferred embodiment is a standard USB (Universal Serial Bus) connector. Memory device 22 can be any suitable memory device such as an EPROM, static memory or ASIC and preferably includes the necessary circuitry (such as a USB transceiver) to operably connect memory device 22 to a computing device (not shown), such as a personal computer, computer tablet or smartphone, through interface 26. Alternatively, memory module 18 can include separate electronics to enable memory device 22 to connect to a computing device.

Memory module 18 can be fabricated in a variety of manners, as will occur to those of skill in the art, and in a presently preferred embodiment memory module 18 is a plastic body over-molded onto memory device 22, interface 26 and any other associated electrical circuitry. As will be apparent, when memory module 18 is properly fabricated, the electrical conductors of interface 26 are correctly exposed to engage complementary conductors on a computing device.

Figure 2:
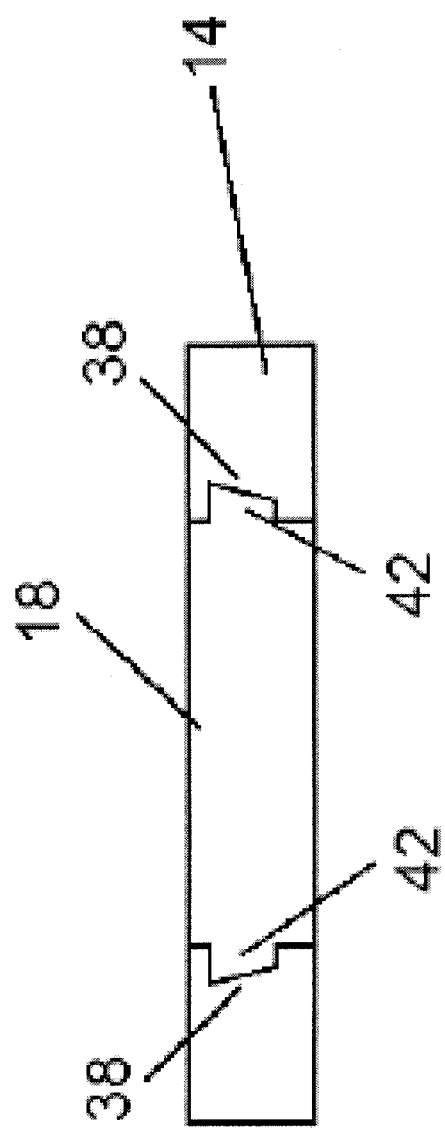
FIG. 2 shows the end of the information device of FIG. 1 looking in the direction of arrow A of FIG. 1.

Housing member 14 includes a recess 30 into which memory module 18 can be inserted, as best seen in FIGS. 1b and 2. Housing member 14 further includes a hollow receptacle 34, into which interface 26 is received when memory module 18 is inserted into housing member 14. By receiving interface 26 within receptacle 34, damage, contamination and/or static electricity are prevented from affecting the electrical conductors of interface 26.

To maintain memory module 18 within housing 14, the sides of recess 30 are provided with tracks 38 which engage complementary rails 42 formed on the sides of memory module 18. Rails 42 engage tracks 38 with an interference fit such that memory module 18 is frictionally retained with recess 30 until a user pulls on memory module 18 to extract it from recess 30 of housing 14. The clearances of tracks 38 and rails 42 are such that only a minor effort is required on the part of a user to extract memory module 18 from recess 30.

Housing member 14 can be fabricated in a suitable manner as will occur to those of skill in the art and in a present embodiment is molded from thermoplastic material.

Information device 10 is intended to be distributed by a marketer to customers and potential customers as part of printed marketing materials. For example, information device can be affixed to a brochure, pamphlet or other printed material which is mailed to potential customers. In such a case, an adhesive can be applied to housing member 14 to affix it to the printed material in an orientation and position such that a customer can remove memory module 18 from housing 14 and/or reinsert memory module 18 into housing 14 while housing 14 remains attached to the printed material. Alternatively, a removable glue, such as fugitive glue, can be used to affix information device 10 to the printed material and information device 10 can be removed from the printed material, if desired.

Figure 3:
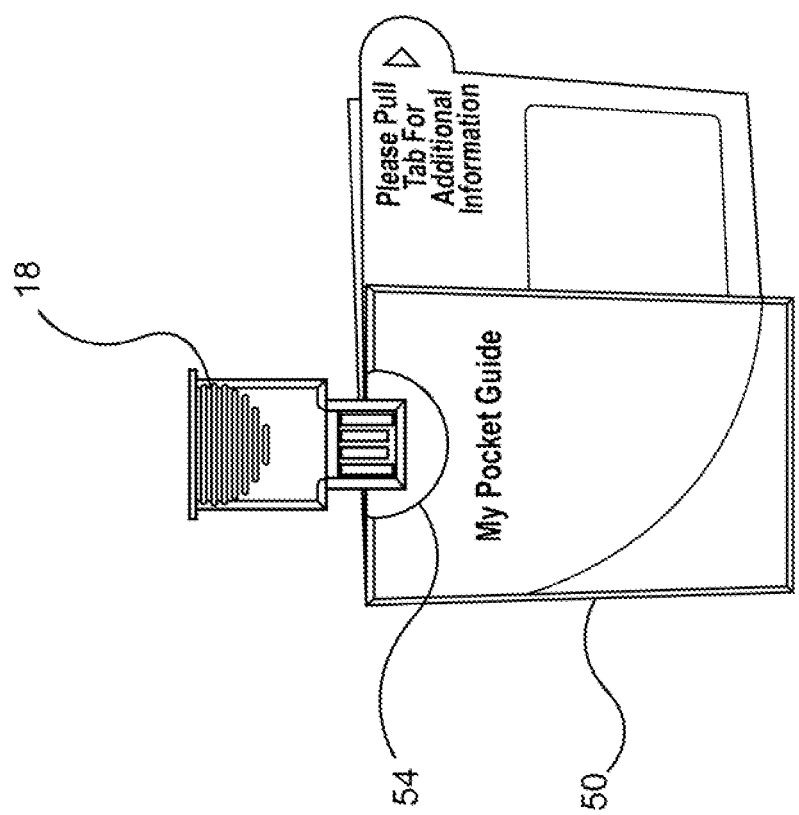
FIG. 3 shows a perspective view of the information device of FIGS. 1a and 1b enclosed within a paper product envelope.

In another example, with reference to FIG. 3, information device 10 can be enclosed within a three dimensional envelope 50 of cardboard or paper with an appropriate opening 54 through which memory module 18 is exposed and can be removed from housing 14 which remains within envelope 50. As can be seen in the Figure, envelope 50 can be printed with marketing information and, as will be apparent to those of skill in the art, can be a wide variety of shapes and sizes.

As should now be apparent to those of skill in the art, while housing 14 is shown as being rectangular in the attached Figures, the present invention is not so limited and housing 14 can be any of a variety of shapes and/or sizes provided only that interface 26 of memory module 18 is protected within housing 14 and that information device 10 can be affixed to or enclosed within the desired printed marketing materials. It will also be apparent to those of skill in the art that, alternatively, housing 14 can be fabricated with features such as through holes or thin flanges of edge material, etc. allowing it to be mechanically attached, by staples, rivets, etc. it is further contemplated that stickers or decals with appropriate marketing information can be applied to housing 14 and, in such a case, information device 10 can be distributed directly to customers without other associated printed materials.

With the present invention, at least a set of program instructions are stored in memory device 22 prior to distribution of information device 10 to a customer. When interface 26 of memory module 18 is correctly engaged to the corresponding interface on a computing device, the program instructions stored in memory device 22 preferably engage an autorun function on the computing device to automatically initiate a web browser session on the computing device and to provide, from memory device 22, a URL for that web browser session. Autorun functions are well known to those of skill in the art and widely used.

Thus, as should now be apparent to those of skill in the art, when a user removes memory module 18 from housing 14 of information device 10 and inserts memory module 18 into the appropriate interface (eg.—a USB port) on their computing device, that computing device will open the default web browser program on that computing device and will direct that browser session to a URL stored in memory device 22. That URL will direct the user to a web site which has marketing materials related to the product being marketed with information device 10.

While the above described system method and device has advantages over the prior art, in a presently preferred embodiment of the invention a unique identifier such as a serial number is also stored in memory device 22 prior to providing a user with information device 10 and the marketer preferably maintains a database relating the unique identifier in memory device 22 with the identity of a specific customer that the marketing material including information device 10 is sent to.

In this case, when interface 26 of memory module 18 is inserted into a corresponding interface of a computing device and the autorun function is invoked, the URL used to initiate the web browser session will include the unique identifier and thus the web site server of the marketing information will be receive that unique identifier and can identify that unique targeted customer.

If the marketer has a database relating each unique identifier to a target customer, then the marketer will now have an indication of the user who has connected to their server. The marketer can then compile a variety of potentially useful information about the user, including the fact that the user has received information device 10 and/or any related marketing materials and that the marketing campaign has been successful enough to encourage the user to seek further information via information device 10. If desired, the marketer can obtain a variety of additional information, such as which parts of the web site the user visited, how long they spent viewing which parts of the web site, how many times they visited the web site, etc.

Even if the marketer did not maintain a database linking the unique identifier to a specific customer, the marketer can maintain records of the activities undertaken by the customer who has a specific information device 10, such as when they visited the web site, what parts of the site they loaded and for how long, etc. This information can be used to identify users who are good targets for additional market efforts, to identify marketing activities which succeed with users and/or to alter web sites and/or other marketing collateral to improve their marketing efficiencies.

As will now be apparent, the present invention provides a novel system, method and device for initiating and preferably tracking web-based marketing efforts. An information device is provided to potential customers, either in conjunction with printed marketing materials of by itself, and that information device includes a memory module which can be interfaced to a computing device of the potential customer. When interfaced to a computing device, the memory module invokes a web browser session on the computing device and supplies a URL to the invoked web browser session, directing the session to a web site relating to the marketing effort. In a preferred embodiment of the invention, the memory module further includes a unique identifier which can be used to track the potential customer's activities on the web site.

It is further appreciated that memory module 18 and housing 14 are substantially flat/planar such that the information device can be affixed to a planar substrate without substantially changing the profile of the planar substrate as will be described below with reference to FIGS. 9 to 25. For example, in some implementations memory module 18 and housing 14 are each less than about 5 mm thick. It is appreciated that memory device 22 is suitably adapted to be less than about 5 mm thick such that when memory device 22 is in memory module 18, memory module 18 can in turn be less than about 5 mm thick. However in other implementations, memory module 18 and housing 14 can be about 5 mm thick. In yet further implementations a thickness of memory module 18 and housing 14 can be in a range from about 2.5 mm to about 8.5 mm. It is further appreciated that the thickness of memory module 18b can depend on a size of memory device 22. For example, the more data memory device 22 is configured to store, the larger memory device 22 can be. Hence, as the amount of data memory device 22 is configured to store increases, the thicker memory device 22 can be. Memory module 18 is then designed to a commensurate thickness, and housing 14 can be a similar thickness such that device 10 is substantially flat and/or planar.

Furthermore, device 10 can be any suitable length and width. For example, a length of device 10 can be in a range from about 35 mm to about 55 mm and a width of device 10 can be in a range of about 25 mm to about 45 mm. In particular non-limiting implementations, device 10 can be about 5 mm thick, about 35 mm wide and about 45 mm long.

However, the width and length dimensions are understood to be not particularly limiting, and are further not to be construed as limiting device 10 to be rectangular. Rather, any suitable combination of widths and lengths and shape are within the scope of present implementations. For example device 10 could be circular, elliptical, irregularly shaped, made in the form a logo or other ornamental shape, or the like.

It is yet further more appreciated that while device 10 is substantially planar, variations in the thickness of device 10 are within the scope of present implementations. For example, device 10 can be sloped along the length and/or width in any suitable direction and further can be rough and/or smooth in any suitable area of the surface of device 10. Furthermore the thickness can vary as desired in any suitable direction and/or in any suitable pattern, regularly or irregularly as desired.

Hence, device 10 can be attached to a planar substrate, such as a sample or product header, or the like, made from plastic, cardboard etc. The planar substrate can in turn be attached to a container, for example a container housing a product. Memory device 22 can accordingly be pre-programmed with information regarding a product associated with the container and/or a URL associated with the product and optionally the autorun function described above. The planar substrate can also comprise printed information about the product and/or a service associated with the product and/or directions for using memory device.

The planar substrates with device 10 attached thereto can in turn be stacked and/or shipped and/or transported to another location where they can be attached to a container; memory module 18 can be removed from housing 14 when the container is sold and/or provided to a consumer so that the consumer can be provided with further information about the product and/or a service associated with the product by inserting the memory module 18 into a computer to retrieve the further information. Non-limiting examples of planar substrates and the like are described below with reference to FIGS. 10-18 and 20-25.

Figure 4:
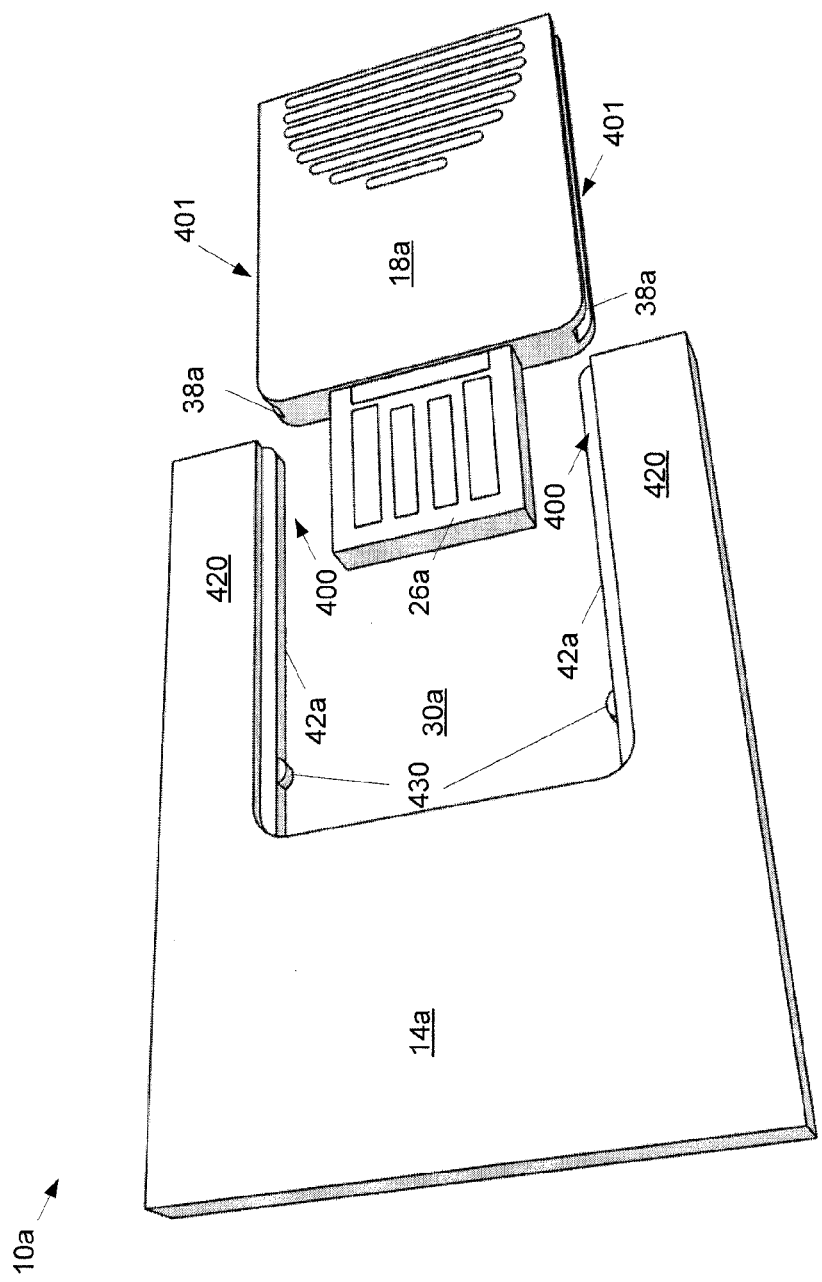
FIG. 4 shows a perspective view of an information device, the information device being in an open position, in accordance with the present invention.
Figure 5:
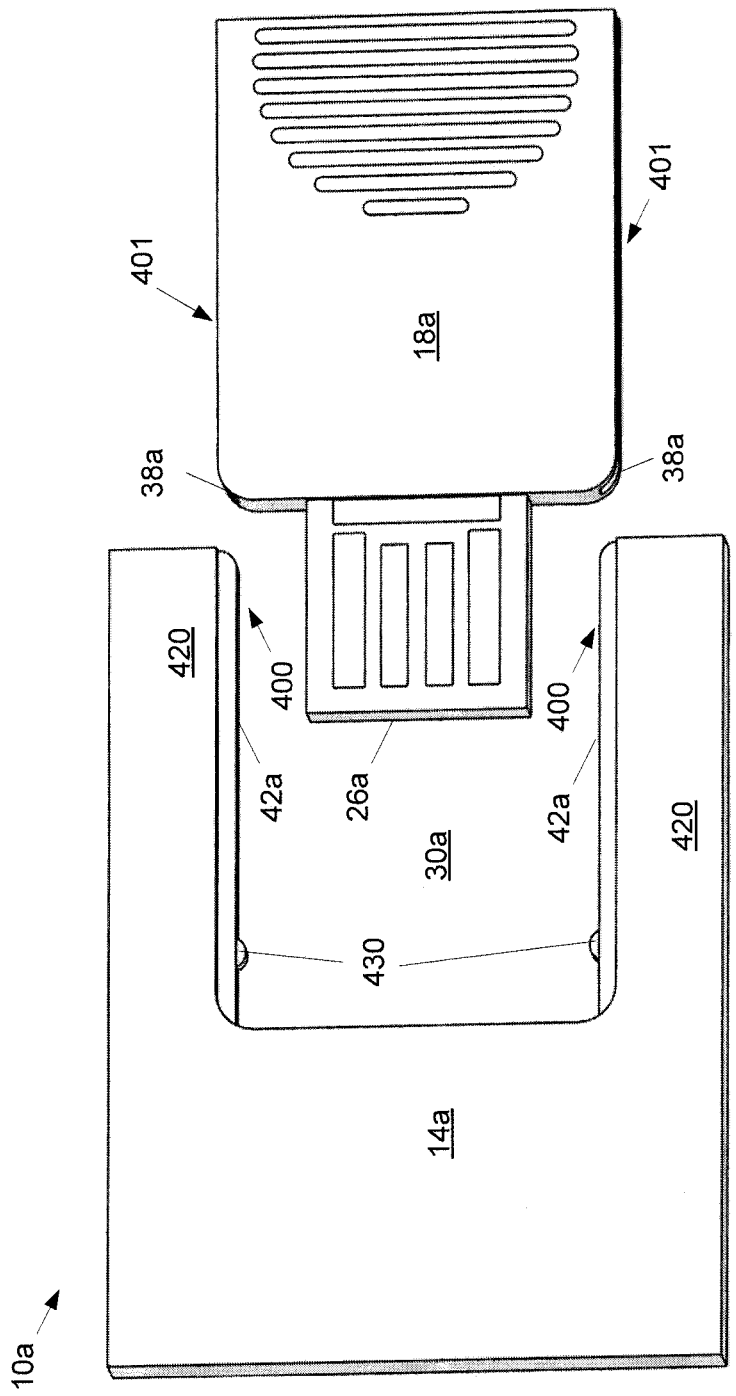
FIG. 5 shows a front view of the information device of FIG. 4, the information device being in an open position, in accordance with the present invention.
Figure 6:
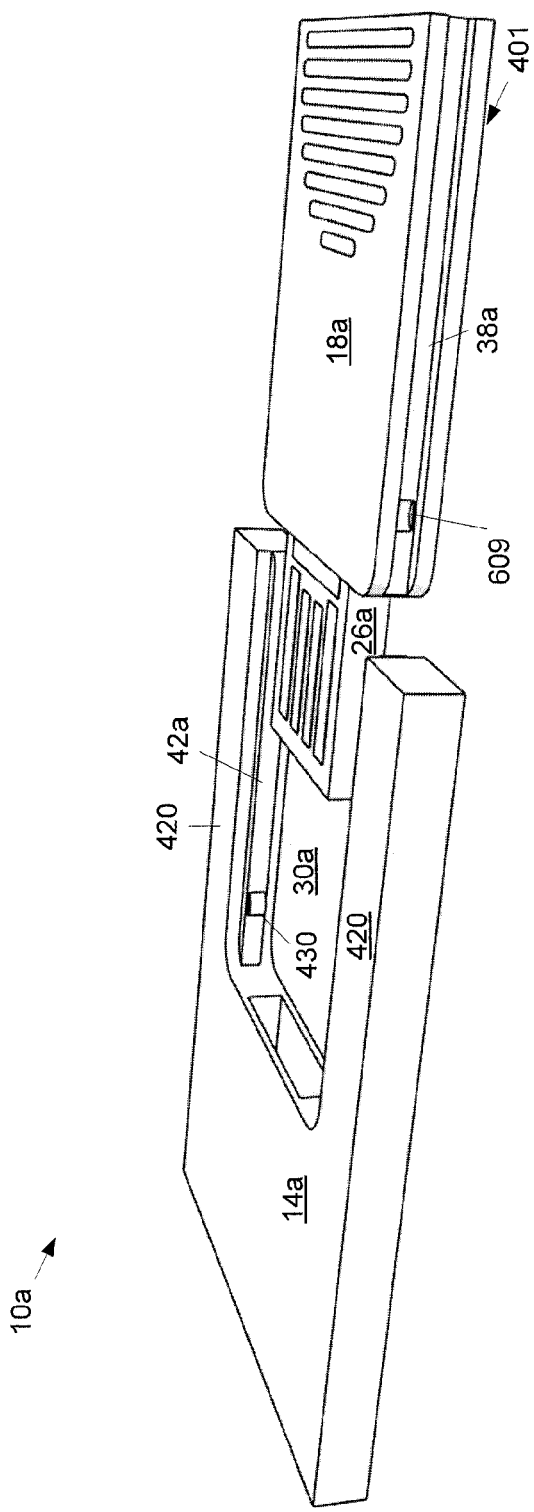
FIG. 6 shows a perspective side view of an information device of FIG. 4, the information device being in an open position, in accordance with the present invention.

Attention is now directed to FIGS. 4 to 6 which each depict an information device 10a for use with a computing device, according to non-limiting implementations. Device 10a is substantially similar to device 10, with like elements having like numbers however with an "a" appended thereto. For example, device 10a includes a housing member 14a and a memory module 18a each similar to housing member 14 and memory module 18. It is appreciated that like device 10, memory module 18a and housing 14a are substantially flat such that device 10a can be affixed to a planar substrate without substantially changing the profile of the planar substrate. In some implementations memory module 18a and housing 14a are less than about 5 mm thick. However in other implementations, memory module 18a and housing 14a can be about 5 mm thick. In yet further implementations a thickness memory module 18a and housing 14a can range from about 2.5 mm to about 8.5 mm. It is further appreciated that the thickness of memory module 18a can depend on a size of memory device contained therein, similar to memory device 22. For example, the more data a memory device contained in memory module 18a is configured to store, the larger is memory device. Hence, as the amount of data the memory device is configured to store increases, the thicker memory device can be. Memory module 18a is then designed to a commensurate thickness, and housing 14a can be a similar thickness such that device 10a is substantially flat.

Furthermore, device 10a can be any suitable length and width. For example, a length of device 10a can be in a range from about 35 mm to about 55 mm and a width of device 10a can be in a range of about 25 mm to about 45 mm. In particular non-limiting implementations, device 10a can be about 5 mm thick, about 35 mm wide and about 45 mm long.

However, the width and length dimensions are understood to be not particularly limiting, and are further not to be construed as limiting device 10a to be rectangular. Rather, any suitable combination of widths and lengths and shape are within the scope of present implementations. For example device 10a could be circular, elliptical, irregularly shaped, made in the form a logo or other ornamental shape, or the like.

It is yet further more appreciated that while device 10 is substantially planar, variations in the thickness of device 10a are within the scope of present implementations. For example, device 10a can be sloped along the length and/or width in any suitable direction and further can be rough and/or smooth in any suitable area of the surface of device 10. Furthermore the thickness can vary as desired in any suitable direction and/or in any suitable pattern, regularly or irregularly as desired.

It is furthermore appreciated that while device 10a is shown as being rectangular in the attached Figures, the present invention is not so limited and housing 14a and memory module 18a can be any of a variety of shapes and/or sizes provided only that interface 26a of memory module 18a is protected within housing 14a and that information device 10 can be affixed to a desired planar substrate. It will also be apparent to those of skill in the art that, alternatively, housing 14a can be fabricated with features such as through holes or thin flanges of edge material, etc. allowing it to be mechanically attached, by staples, rivets, etc. it is further contemplated that stickers or decals with appropriate marketing information can be applied to housing 14a and, in such a case, information device 10a can be distributed directly to customers without other associated printed materials.

From FIGS. 4 to 6 it is further appreciated that at least one of sides 400 of the recess 30a and complementary sides 401 of the memory module 18a comprise at least one retaining mechanism for frictionally retaining memory module 18a in recess 30a when electrical interface 26a is received in receptacle 34a, as will presently be described.

As described above, to maintain memory module 18a within housing 14a, sides 400 of recess 30a are provided with tracks 38a which engage complementary rails 42a aformed on sides 401 of memory module 18a. Rails 42a engage tracks 38a with an interference fit such that memory module 18a is frictionally retained within recess 30a until a user pulls on memory module 18a to extract it from recess 30a of housing 14a. Hence, in some implementations, the retaining mechanism can comprise the combination of rails 42a and tracks 38a. It is further appreciated that, while in present implementations, rails 42a are aformed on sides 400 of recess 30a, and tracks 38a are aformed on sides 401 of memory module 18a, in other implementations the location of rails 42a and tracks 38a can be reversed such that rails 42a are aformed on sides 401 of memory module 18a, and tracks 38a are aformed sides 400 of recess 30a.

In other implementations, as depicted, the at least one retaining mechanism comprises at least one boss 430 and at least one complementary depression 609 for receiving boss 430. The at least one boss 430 can be on one of sides 400 of recess 30a and complementary sides 401 of memory module 18a, and the at least one complementary depression 609 can be on the other of sides 400 of recess 30a and complementary sides 401 of memory module 18a. As depicted, housing 14a comprises two opposing bosses 430 on opposite sides 400 of recess 30a, and two complimentary depressions 609 on opposite sides of memory module 18a: though only one complimentary depression 609 is visible in FIG. 6, it is appreciated that a similar depression 609 is on a side opposite the visible side 401.

It is further appreciated that the positions of bosses 430 and depressions 609 can be reversed such that bosses 430 are on memory module 18a and depressions 609 are in a complimentary position on sides 400 of recess 30a.

It is yet further appreciated that the shape of depression 609 can be substantially complimentary to boss 430 such that boss 430 can be retained in depression 609. It is further appreciated that each of boss 430 and depression 609 comprises a rounded profile to assist in "snapping" boss 430 into depression 609, as well as removing boss 430 from depression 609.

It is yet further appreciated that in depicted implementations, device 10a comprises both rails 42a and tracks 38a, as well as bosses 430 and depressions 609. Indeed, is it yet further appreciated that bosses 430 and depressions 609 are located on rails 42a and tracks 38a respectively, bosses 430 and depressions 609 assisting with the frictional retention of memory module 18a in housing 14a. Hence, when substantially planar device 10a is affixed to a planar substrate, as will be described below, there is less opportunity for memory module 18a to unintentionally slip out of housing 14a. Such a retaining mechanism also ensures that memory module 18a is frictionally retained in housing 14a in any given orientation.

Figure 7:
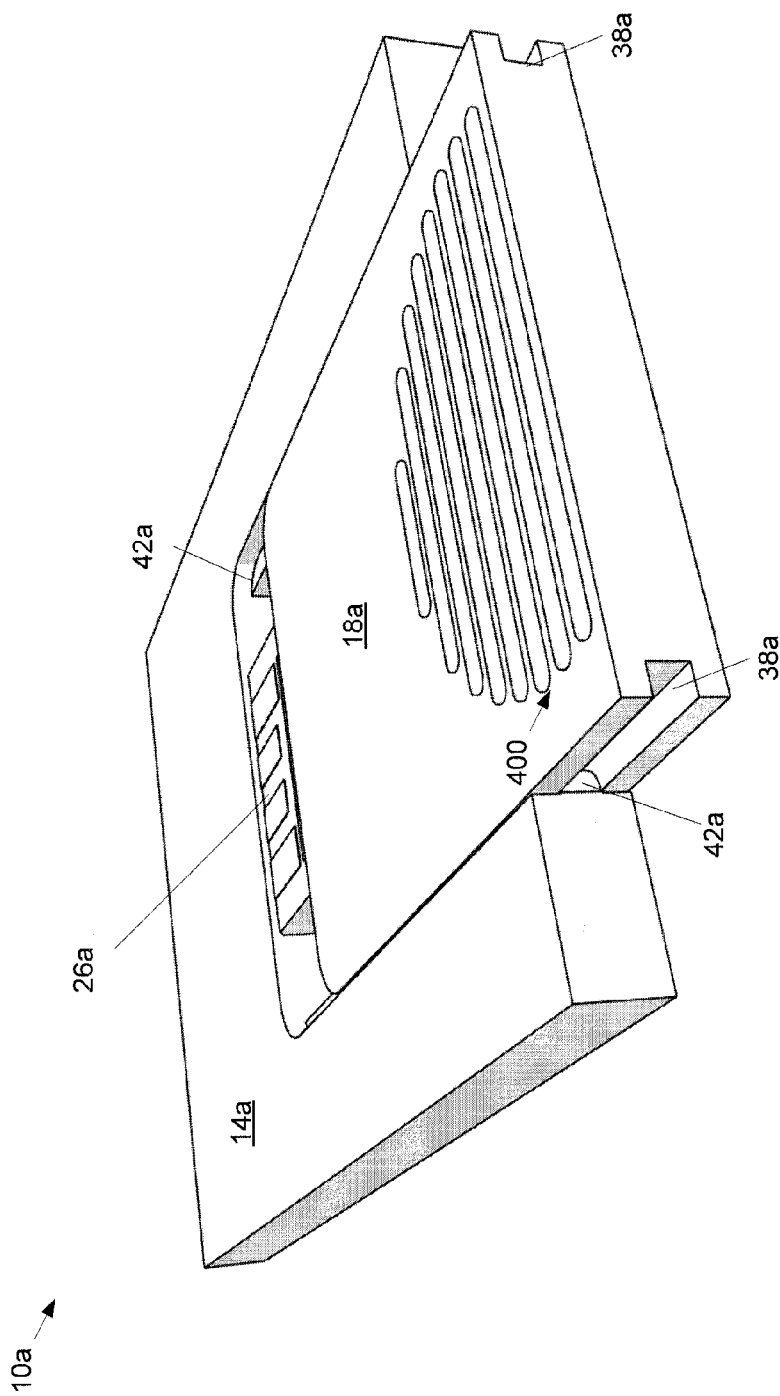
FIG. 7 shows a perspective right side view of an information device of FIG. 4, the information device being in a partially closed position, in accordance with the present invention.
Figure 8:
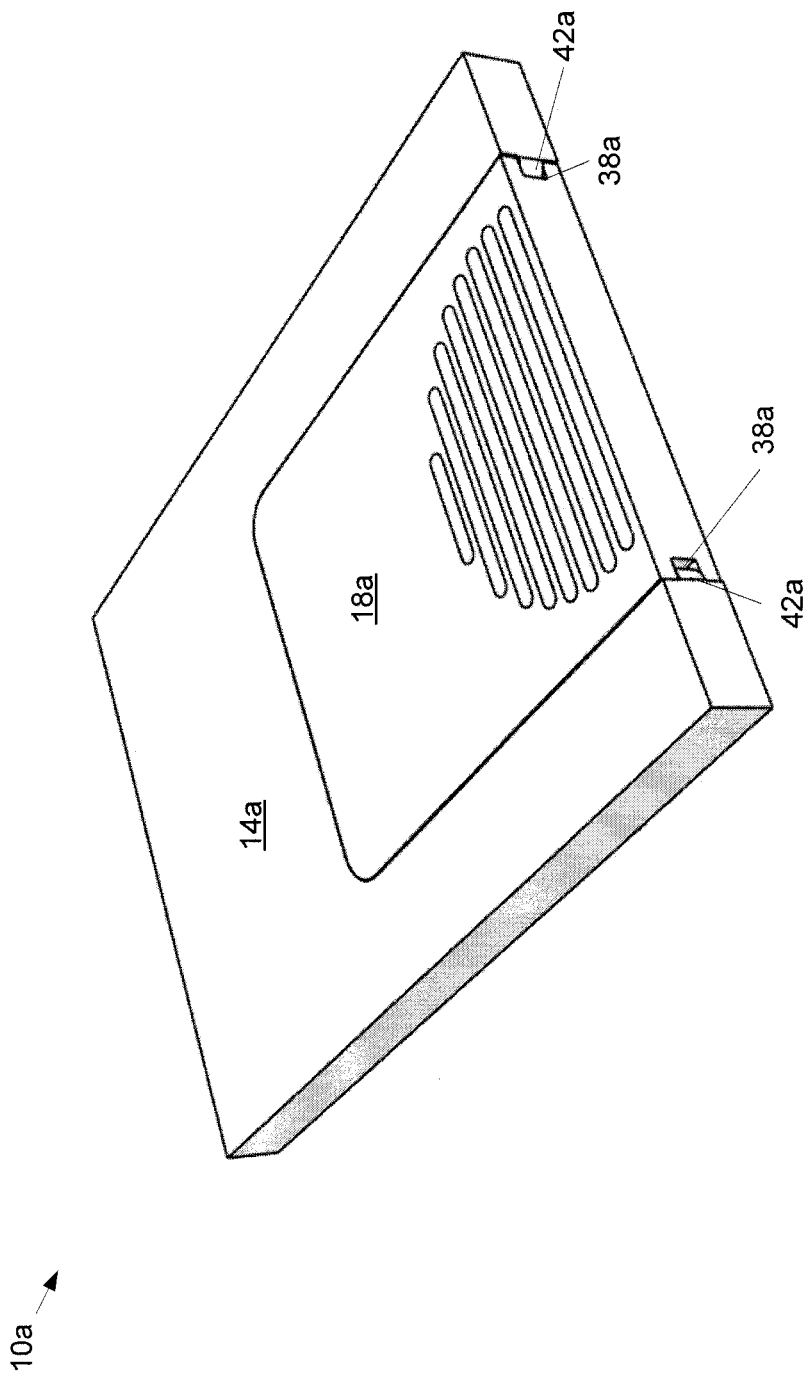
FIG. 8 shows a perspective right side view of an information device of FIG. 4, the information device being in a closed position, in accordance with the present invention.

For example, FIG. 7 depicts device 10a in a partially closed position with tracks 38a of memory module 18a having been slid onto rails 42a of housing 14a; it is appreciated that in FIG. 7 bosses 430 have yet to engage respective depressions 609 (neither of which are visible in FIG. 7, being obscured by memory module 18a and housing 14a). Similarly, FIG. 8 depicts device 10a in a closed position with memory module 18a frictionally retained in housing 14a via both rails 42a/tracks 38a, and bosses 430/depressions 630.

It is yet further appreciated that the rail/track and/or boss/depression structures can be implemented in information devices that are similar to devices 10, 10a, but that are not necessarily planar. Rather such information devices can include rail/track and/or boss/depression structures similar to devices 10, 10a, but can comprise any suitable thickness, height, length, and shape.

Returning to FIGS. 4 to 6, it is further appreciated that recess 30a is defined by two substantially parallel arms 420. In some implementations, each of the two substantially parallel arms 420 is enabled to flex away from recess 30a, as bosses 430 pass along the complementary side of memory module 18a before being received in complementary depression 609. However, it is further appreciated that arms 420 are generally biased towards the substantially parallel position.

Figure 9:
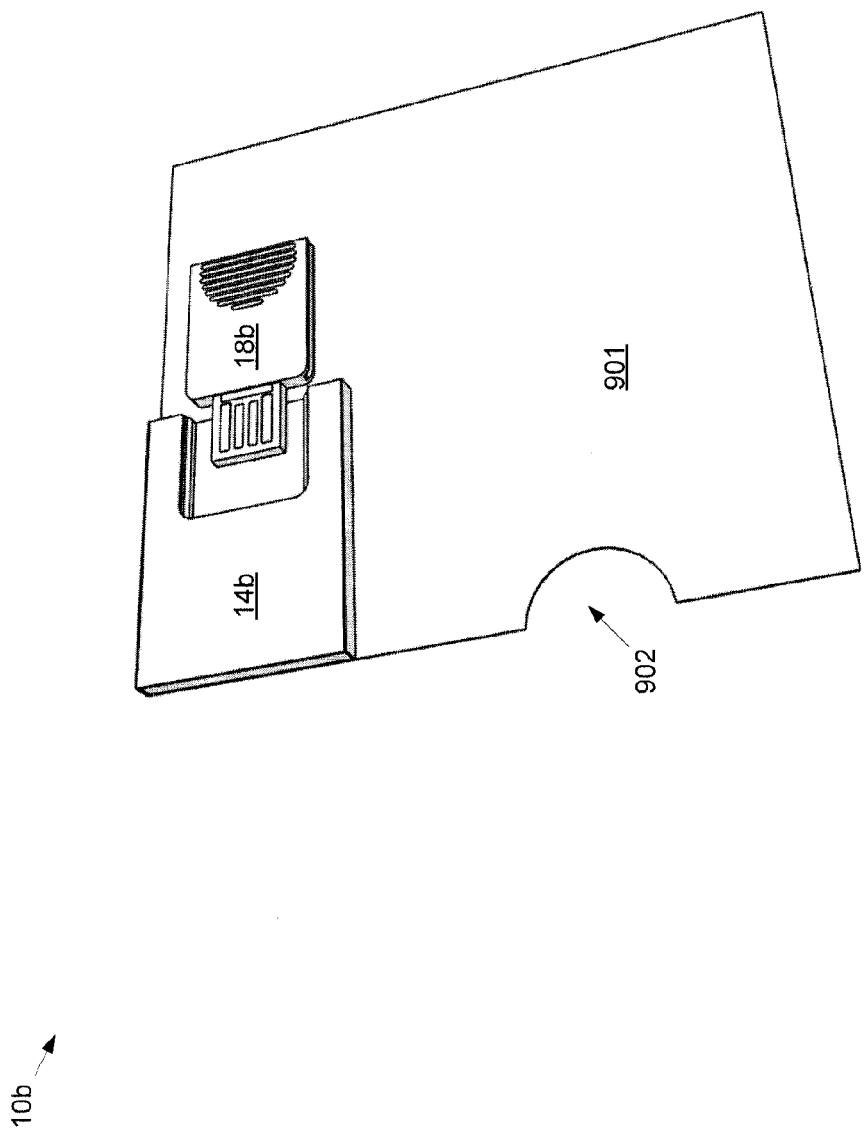
FIG. 9 shows a perspective view of an information device, the information device being in an open position, in accordance with the present invention.

Attention is next directed to FIG. 9, which depicts an information device 10b for use with a computing device. Device 10b can be substantially similar to at least one of device 10 and device 10a, and includes a housing 14b and memory module 18b, which are respectively substantially similar to at least one combination of housing 14a and memory module 18a, and housing 14 and memory module 18. In any event, it is appreciated that memory module 18b and housing 14b are substantially flat, for example less than about 5 mm thick. However in other implementations, memory module 18b and housing 14b can be about 5 mm thick. In yet further implementations a thickness memory module 18b and housing 14b can range from about 2.5 mm to about 8.5 mm. It is further appreciated that the thickness of memory module 18b can depend on a size of memory device contained therein, similar to memory device 22. For example, the more data a memory device contained in memory module 18b is configured to store, the larger and thicker the memory device can be. Hence, as the amount of data the memory device is configured to store increases, the thicker memory device can be. Memory module 18b is then designed to a commensurate thickness, and housing 14b can be a similar thickness such that memory module 18b and housing 14b are substantially flat.

Furthermore, module 18b and housing 14b, when assembled, can be any suitable length and width. For example, a length of module 18b and housing 14b, when assembled can be in a range from about 35 mm to about 55 mm and a width of module 18b and housing 14b, when assembled can be in a range of about 25 mm to about 45 mm. In particular non-limiting implementations, module 18b and housing 14b, when assembled can be about 5 mm thick, about 35 mm wide and about 45 mm long.

However, the width and length dimensions are understood to be not particularly limiting, and are further not to be construed as limiting module 18b and housing 14b, when assembled, to be rectangular. Rather, any suitable combination of widths and lengths and shape are within the scope of present implementations. For example module 18b and housing 14b, when assembled, could be circular, elliptical, irregularly shaped, made in the form a logo or other ornamental shape, or the like.

It is yet further more appreciated that while module 18b and housing 14b are each substantially planar, variations in the thickness of each of module 18b and housing 14b are within the scope of present implementations. For example, module 18b and housing 14b, when assembled, can be sloped along the length and/or width in any suitable direction and further can be rough and/or smooth in any suitable area of the surface of each of module 18b and housing 14b. Furthermore the thickness can vary as desired in any suitable direction and/or in any suitable pattern, regularly or irregularly as desired.

However device 10b further comprises a planar substrate 901, wherein housing 14b is affixed to planar substrate 901. It is appreciated that planar substrate 901 is in turn affixable to a container (for example see FIGS. 10 to 12), such that housing 14b is proximal to the container when planar substrate 901 is affixed thereto. In these implementations, a rounded cutout 902 is present in planar substrate 901 to assist a user in handling planar substrate 901. However, cutout 902 is appreciated to be optional.

Figure 10:
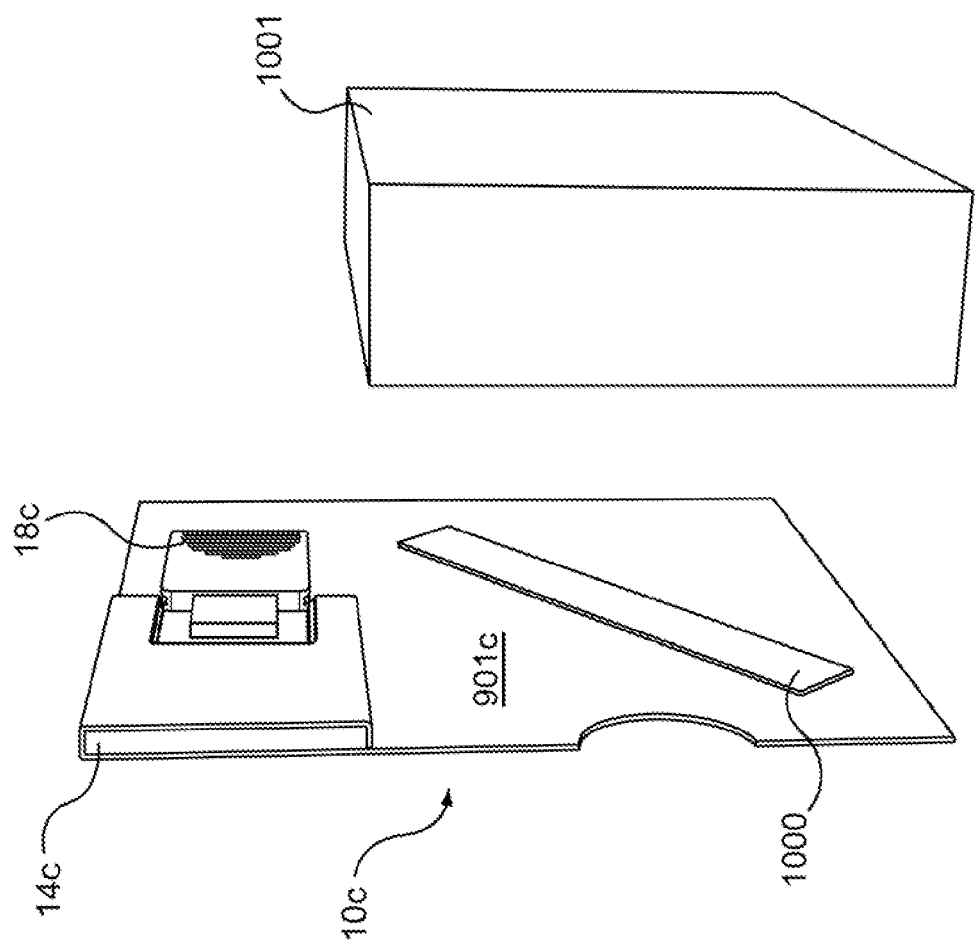

Attention is directed to FIGS. 10 to 12 which depict a device 10c which is substantially similar to device 10b, with like elements having like numbers, however with a "c" appended thereto. Hence planar substrate 901c is similar to planar substrate 901c but comprises an adhesive mechanism 1000 for affixing planar substrate 901c to a container 1001, including but not limited to double sided tape and a suitable adhesive strip.

In any event, FIGS. 10 to 12 depict a sequence in which device 10c is applied to container 1001, wherein in FIG. 10 device 10c is not affixed to container 1001, in FIG. 11 device 10c is brought towards a side of container 1001, and in FIG. 12, planar substrate 901c is affixed to container 1001 such that housing 14b is proximal to container 1001 when planar substrate 901 is affixed thereto.

While in FIGS. 10 to 12, adhesive mechanism 1000 is pre-applied to planar substrate 901c, it is appreciated that a similar apparatus could be applied to planar substrate 901 such that device 10b can also be affixed to a container.

It is appreciated that planar substrates 901, 901c can comprise any suitable material including but not limited to paper, cardboard, plastic metal or the like. Indeed it is appreciated that planar substrate is generally stiff enough to support housing 14b or housing 14c in combination with memory module 18b or memory module 18c, respectively.

With reference to FIG. 9, it is appreciated that housing 14b can be affixed to planar substrate 901 using any suitable process. For example, in some implementations, housing 14b is affixed to planar substrate 901 using a suitable adhesive material, such as a suitable adhesive, double sided tape, a suitable adhesive strip and the like and/or a combination. It is further appreciated that planar substrate 901 comprises an area for affixing housing 14b thereto such that housing 14b is proximal to a container when planar substrate 901 is affixed thereto.

Figure 13B:
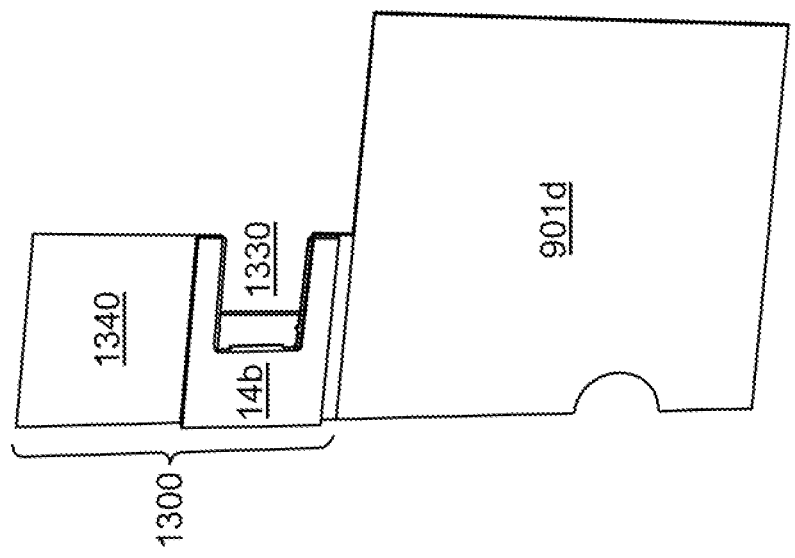
FIGS. 13a and 13b show a planar substrate for affixing a housing of an information device thereto.
Figure 13A:
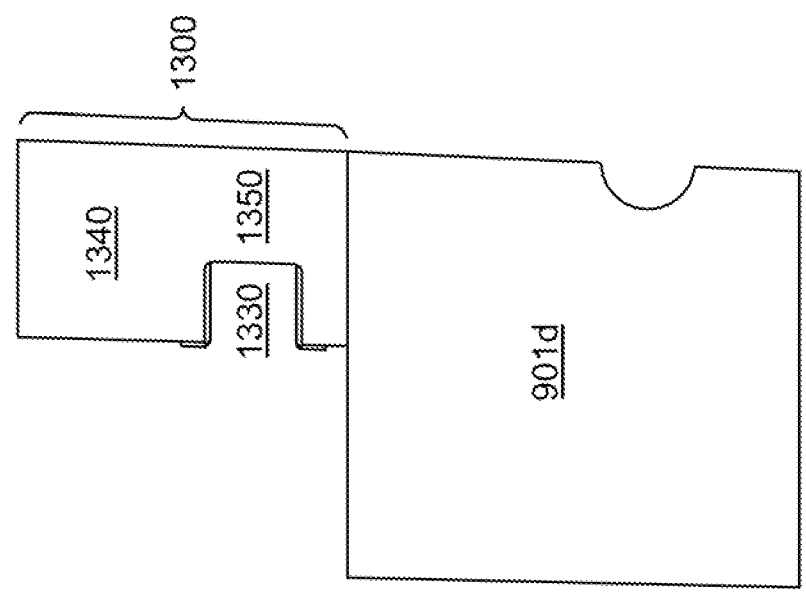

However, in some implementations, for example as depicted in FIGS. 13a and 13b, a planar substrate 901d can comprise a mechanism 1300 for affixing to housing 14b thereto. Mechanism 1300 comprises a cut out for wrapping around housing 14b such that a recess of housing 14b (similar to recess 30), aligns with a similarly shaped recess 1330 in a bottom area 1350 of mechanism 1300: for example, housing 14b can be aligned with recess 1330 and adhered in place on area 1350 as in FIG. 13b. A top flap 1340 of mechanism 1300 is enabled to fold over housing 14b, and then area 1350 folds over onto planar substrate 901d, to arrive at the configuration in FIGS. 9 to 12.

Figure 14B:
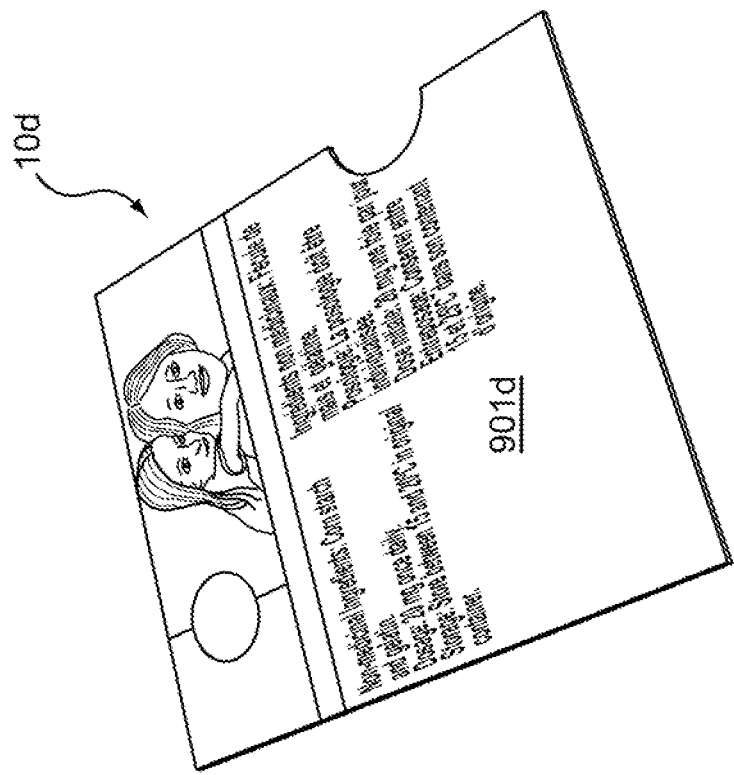
FIGS. 14a and 14b show front and rear perspective views of an information device prior to affixing to a container.
Figure 14A:
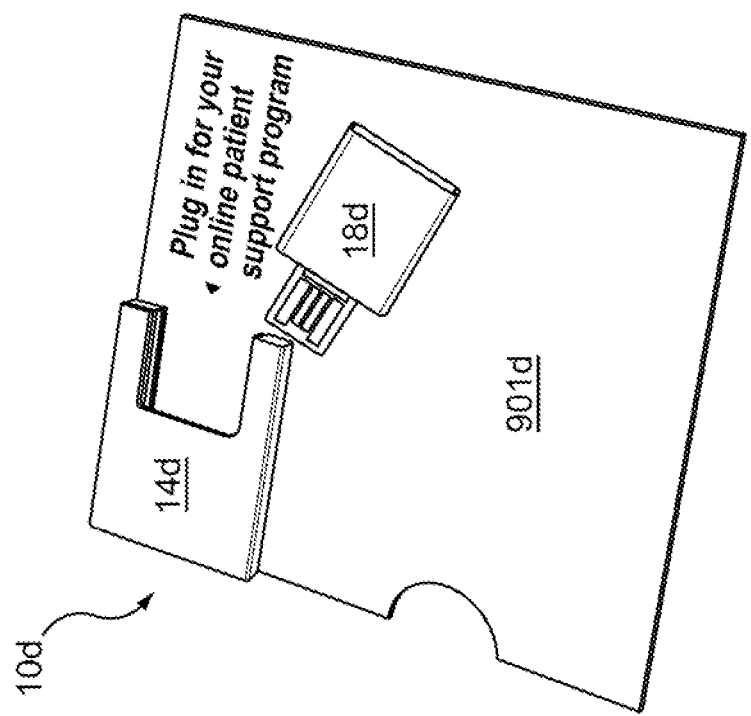

Attention is now directed to FIGS. 14a and 14b, which depicts front and rear views of a non-limiting example implementation of a device 10d similar to device 10c, with like elements having like numbers, however with a "d" appended thereto. With reference to FIG. 14d, it is appreciated that planar substrate 901d comprises printed material on a side opposite housing 14b, the printed material regarding a product associated with a container to which device 10d is to be affixed. In some implementations, such a container is enabled to contain a pharmaceutical product, and the printed material comprises information regarding the pharmaceutical product. In some implementations, the printed material is similar to information printed on a side of the container to which the planar substrate 901d is to be affixed, such that when planar substrate 901d obscures information on the container, the same information is visible on planar substrate 901d. For example, in FIG. 15, device 10d is depicted as affixed to a container 1500. In these implementations, the printed material visible in FIG. 14b is similar to printed material on the back of container 1500 of FIG. 15 to which device 10b is affixed.

Figure 15:
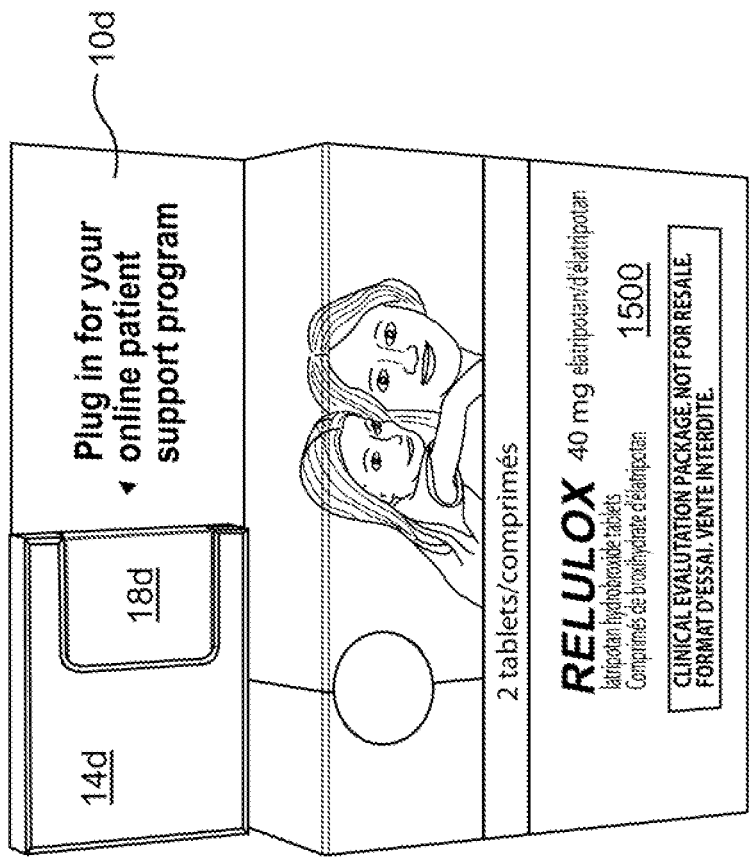
FIG. 15 shows the information device of FIGS. 14a and 14b affixed to a container.

However, as best seen in FIGS. 14a and 15, further information can be provided adjacent housing 14d that is indicative of data stored in memory module 18d, for example information indicating an on-line program accessible via plugging memory module 18d into a computing device to launch a browser, as described above.

In yet further implementations, planar substrate 901d can be integral with the container. For example, a container, such as container 1500 in FIG. 15, can be provided with planar substrate 901d already affixed thereto, and housing 14d can be affixed to planar substrate 901d thereafter.

In other words, planar substrate 901d can be provided alone as a product information device comprising an area for affixing an information device thereto, such as devices 10, 10a. The area can include but is not limited to a space for affixing an information device thereto, mechanism 1300 or the like and/or a combination. Hence, planar substrate 901d can be affixed to container 1500 or the like, and then housing 14d and/or device 10 and/or device 10a can be affixed to planar substrate 901d.

Furthermore, while in FIG. 15 it is appreciated that housing 14d and memory module 18d are oriented along a top edge of container 1500, however in other implementations planar substrate 901d can be affixed to container 1500 such that housing 14*d* and memory module 18*d* are oriented along a side edge or a bottom edge. Indeed, in yet further implementation, a back of planar substrate 901*d* can be affixed to a front of container 1500. It is appreciated that in each different orientation, printed material on device 10*d* can be configured accordingly.

Figure 16:
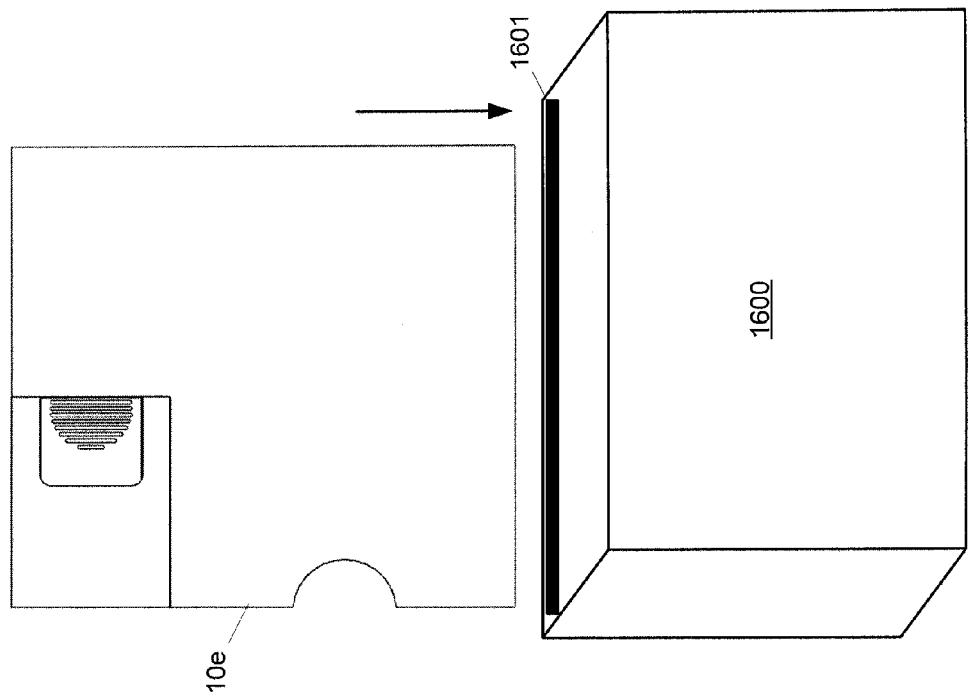
FIG. 16 shows an information device being affixed to a container via a slot.

With reference to FIG. 16, it is further appreciated that a device 10*e*, similar to device 10*d*, can be affixed to a container 1600 by inserting device 10*e* into a slot 1601 or the like in container 1600, as represented by the arrow. Such a slot 1601 can be provided specifically for receiving device 10*d*, but can also be provided due another aspect of container 1600, such as a slot formed by a flap on a lid of container 1600.

Figure 17:
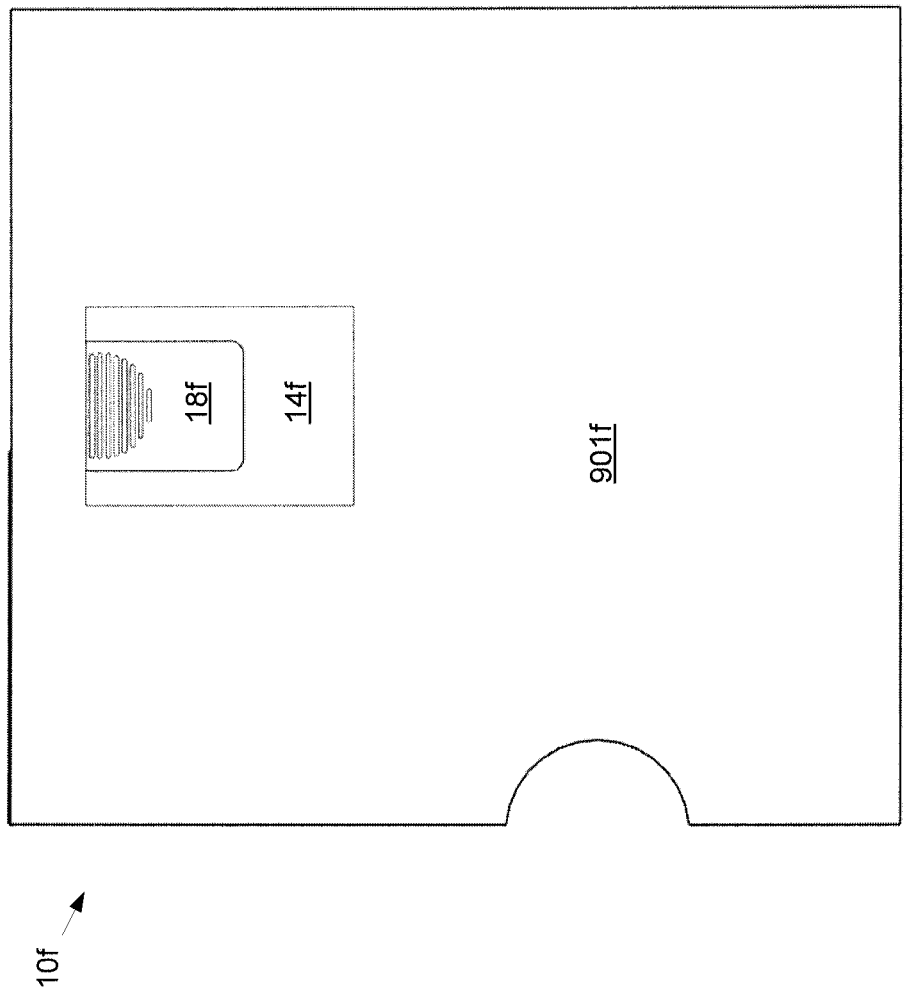
FIG. 17 shows a front view of an information device, the information device being in a closed position, in accordance with the present invention.

Attention is now directed to FIG. 17, which depicts a device 10*f*, substantially similar to device 10*d* with like elements having like numbers, however with an "f" appended thereto. However, the orientation of housing 14*f* on planar substrate 901*f* is 90° from that of housing 14*d* on planar substrate 901*d*; furthermore, housing 14*f* is not located in a corner of planar substrate 901*f* but approximately centered between a left and right edge, but towards a top edge. In other words, both the position and orientation of housing 14*f* on planar substrate 901*f* is not to be considered particularly limiting. Rather, the position and orientation of housing 14*f* on planar substrate 901*f* can be adjusted as desired to suit a given packaging and/or a given container to which planar substrate 901*f* is to be affixed thereto.

Figure 18:
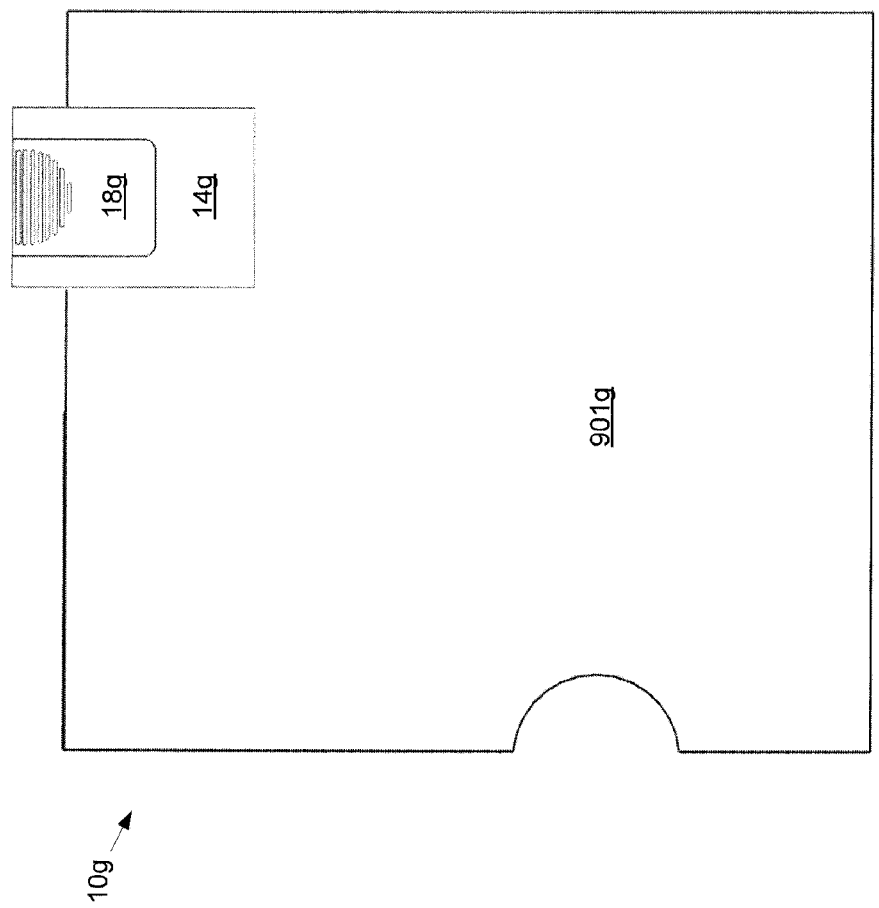
FIG. 18 shows a front view of an information device, the information device being in a closed position, in accordance with the present invention.
Figure 19:
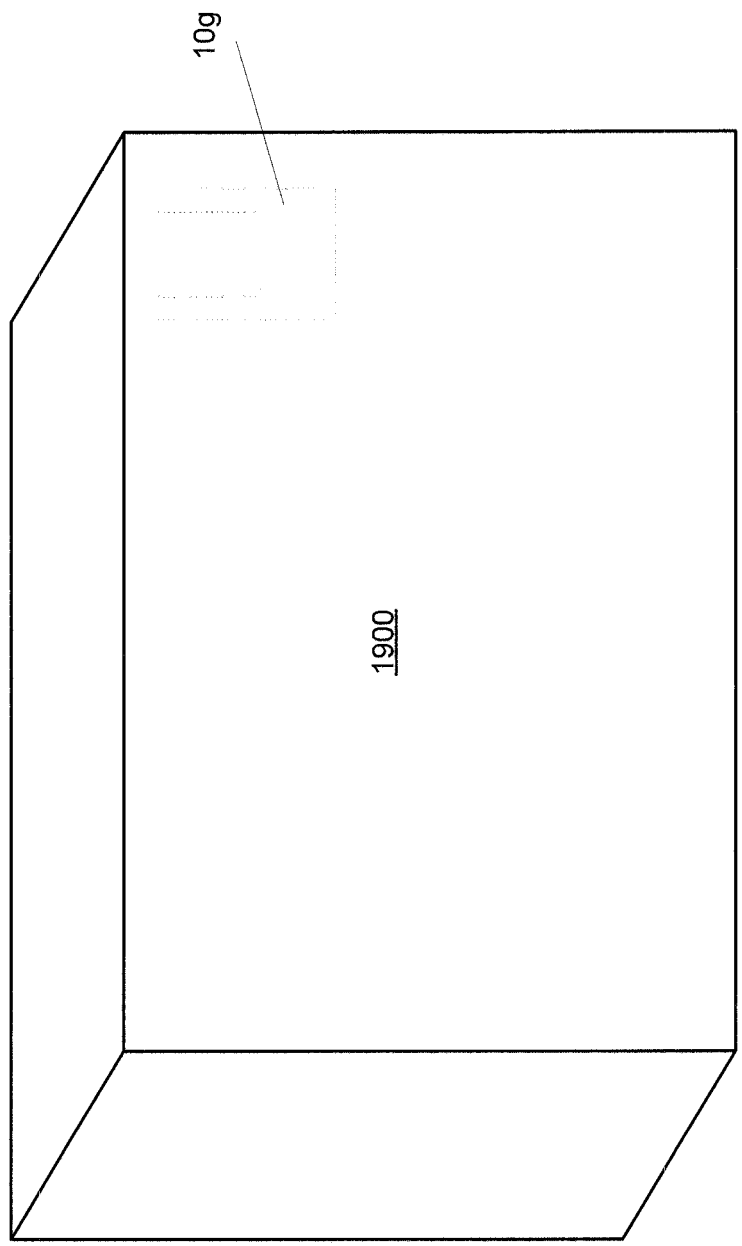
FIG. 19 shows the information device of FIG. 4 affixed to a container.
Figure 20:
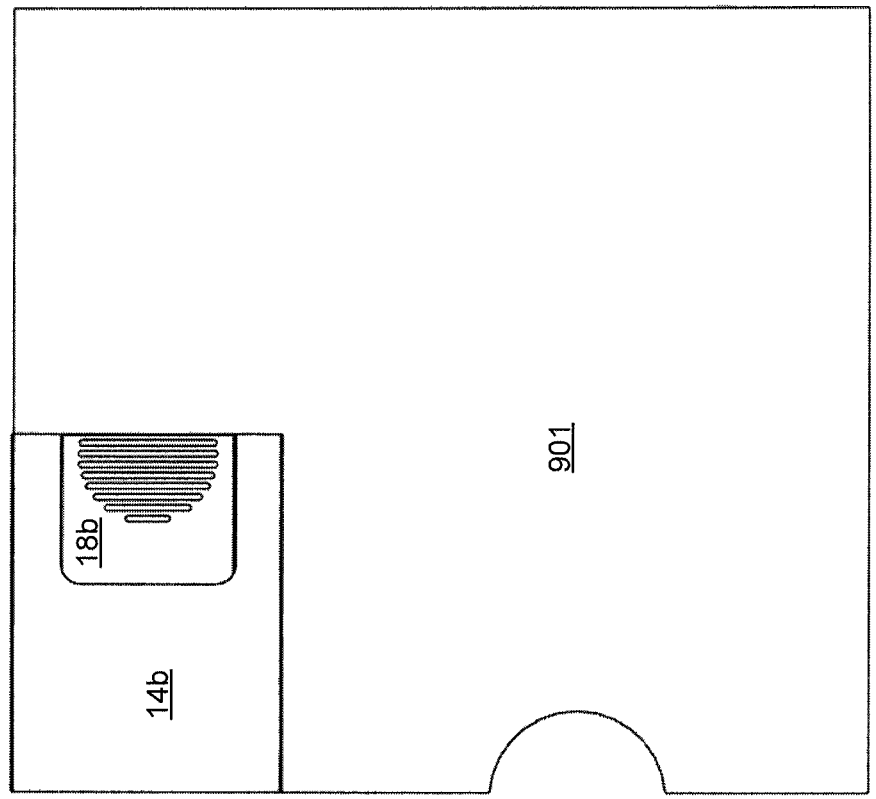
FIG. 20 shows a front side view of the information device of FIG. 9 in a closed position.
Figure 21:
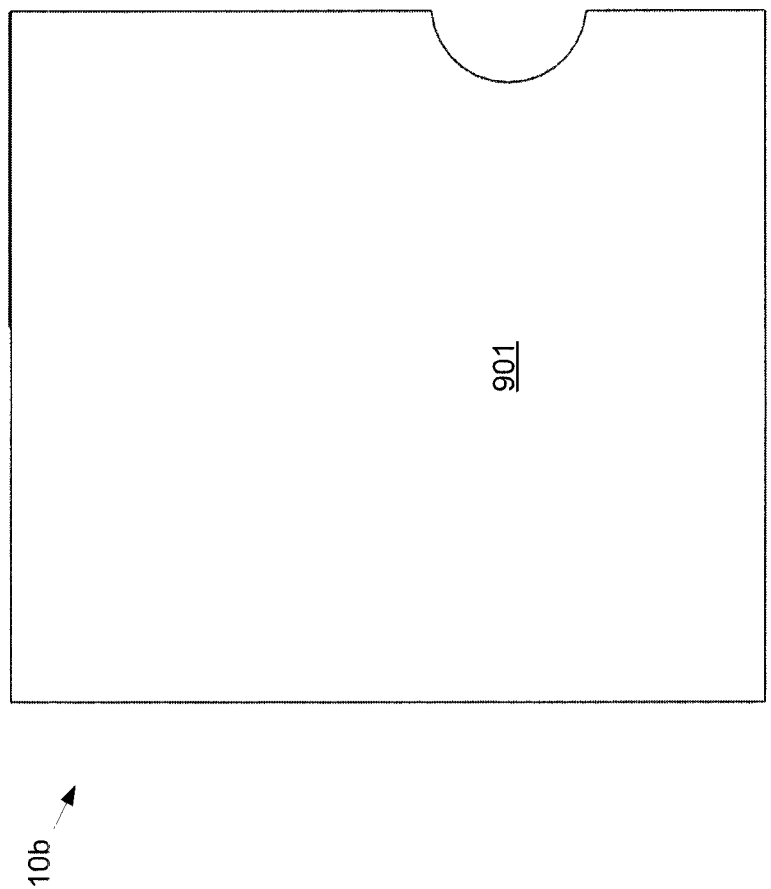
FIG. 21 shows a rear side view of the information device of FIG. 9 in a closed position.
Figure 22:
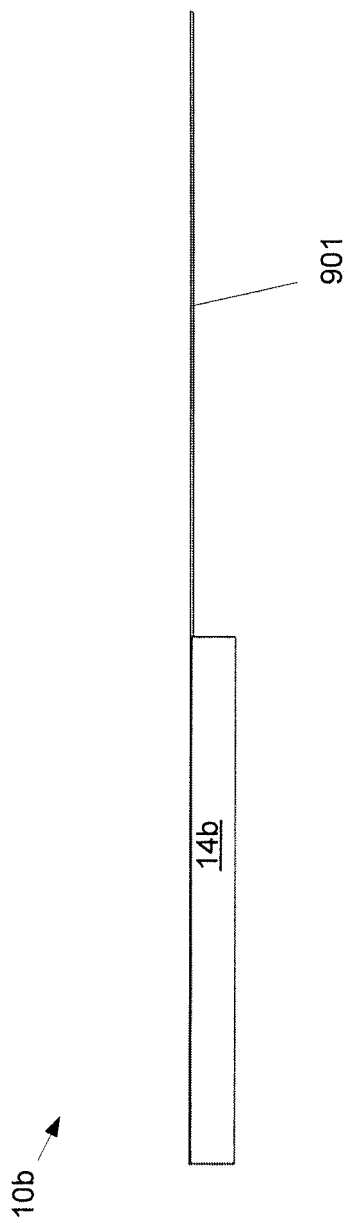
FIG. 22 shows a top side view of the information device of FIG. 9 in a closed position.
Figure 23:
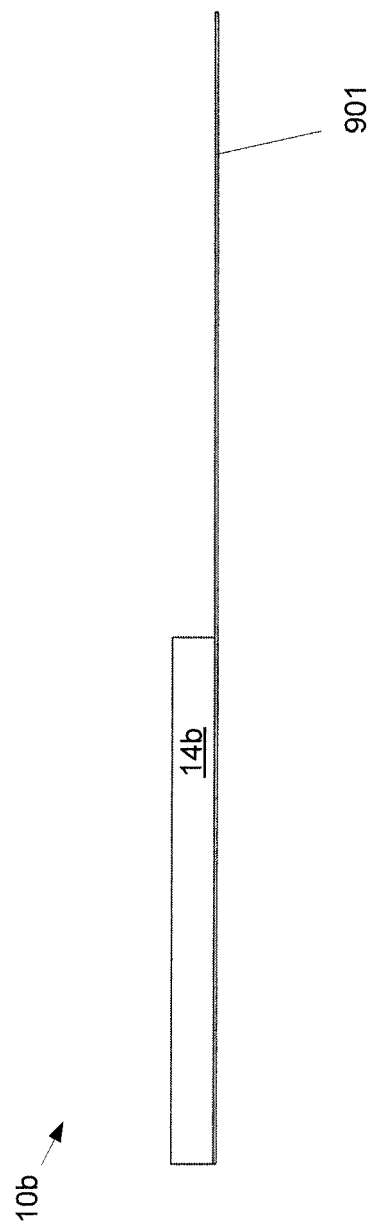
FIG. 23 shows a bottom side view of the information device of FIG. 9 in a closed position.
Figure 24:
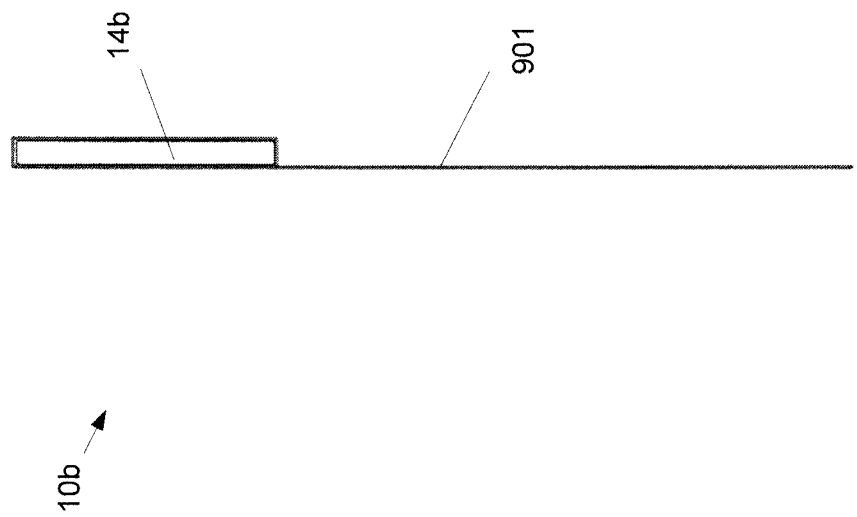
FIG. 24 shows a left side view of the information device of FIG. 9 in a closed position.
Figure 25:
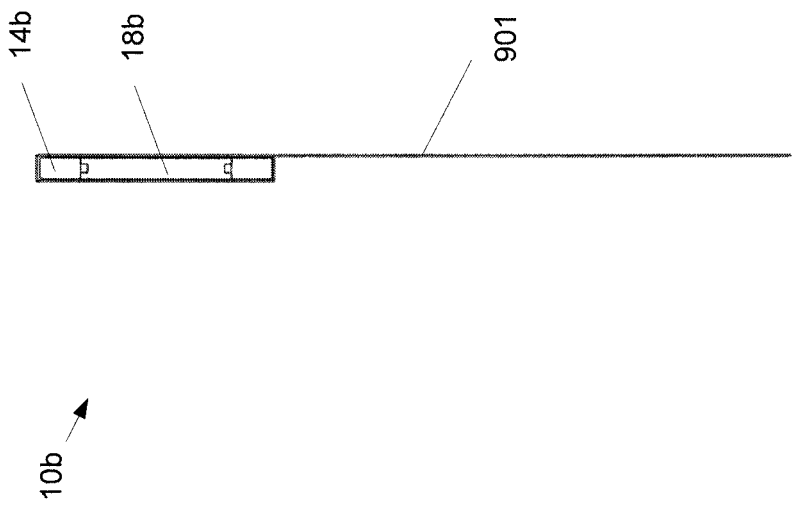
FIG. 25 shows a right side view of the information device of FIG. 9 in a closed position.
Figure 26:
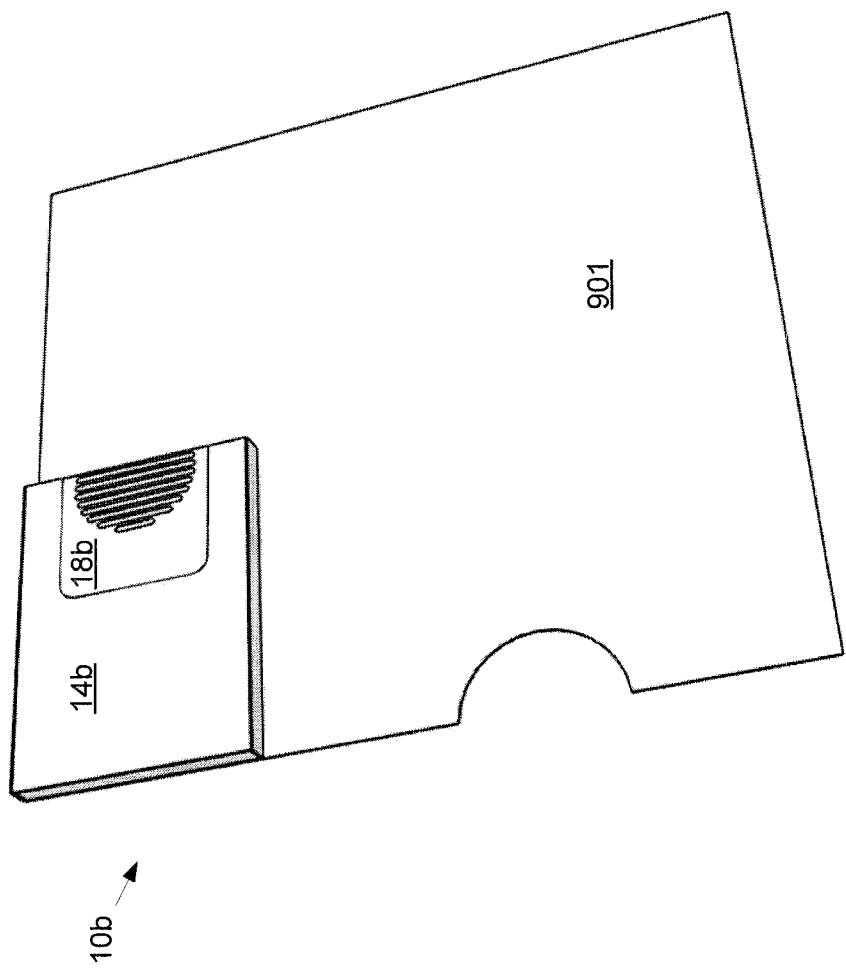
FIG. 26 shows a perspective view of the information device of FIG. 9 in a closed position.

Attention is now directed to FIG. 18, which depicts a device 10*g*, substantially similar to device 10*f* with like elements having like numbers, however with an "g" appended thereto. FIG. 18 shows yet further implementations of information devices described herein where at least a portion of housing 14*g* and/or memory device 18*g* can extend beyond planar substrate 901*g*.

Indeed, it is yet further appreciated that information devices as described herein can be further affixed to any suitable container in any suitable position. For example, attention is now directed to FIG. 19, which depicts a device 10*g*, substantially similar to at least one of device 10 and device 10*a* with like elements having like numbers, however with a "g" appended thereto. Device 10*g* is depicted as being affixed to a container 1900 in a front position, in an upper right corner. However device 10*g* could be affixed at any suitable position and/or orientation using any suitable process, such as gluing or the like.

Furthermore, while containers depicted herein are generally appreciated to be boxes, any suitable container is within the scope of present implementations and is not to be considered particularly limiting.

Attention is now directed to FIGS. 20 to 26 which depict front, rear, top, bottom, left and right side views, and a perspective view respectively of device 10*b*. FIGS. 20 to 26 depict housing 14*b* and memory module 18*b* affixed to planar substrate 901 without substantially changing the profile of planar substrate 901.

It is further appreciated that while planar substrates 901, 901*c*, 90*f*, 901*g* are depicted herein as substantially rectangular, the present invention is not so limited and planar substrates 901, 901*c*, 90*f*, 901*g* can be any of a variety of shapes and/or sizes provided only that each of planar substrates 901, 901*c*, 90*f*, 901*g* provide an area to which a substantially planar memory device can be affixed and that each planar substrates 901, 901*c*, 90*f*, 901*g* be affixable to a container such that a memory module of the memory device can be removed from a housing of the memory device when the planar substrate is affixed to the container.

In any event, an information device is provided which is substantially flat such that the information device can be affixed to a planar substrate without substantially changing the profile of the planar substrate. The planar substrate can comprise printed materials pertaining to a given product. The planar substrate can in turn be affixed to a container associated with the given product such that such that a memory module of the information device can be removed from a housing of the information device when the planar substrate is affixed to the container.

The planar substrates with the information device affixed thereto can be easily stacked and provided to a distributor of the product, who can then affix the planar substrates, and hence the information devices, to containers of the product. Hence, consumers who receive the combination of the container and the information device can use the information device to gain access to further information about the product and/or services associated with the product.

For example, when the product comprise a pharmaceutical product and/or sample, the memory device can include a URI that will cause a browser to retrieve information about the pharmaceutical product and/or cause the browser to provide access to on-line support programs such as patient support programs (e.g. see FIGS. 14*a* and 15).

However it is appreciated that such present implementations are not limited to pharmaceutical products, and that information stored in a memory module of the presently described information devices can pertain to any suitable product, application or service. Furthermore, printed material on associated planar substrates can pertain to any suitable product, application or service, including but not limited to customer follow-up products, applications and services, automotive products, applications and services, real-estate markets products, applications and services, educational on-line resources products, applications and services, healthcare products, applications and services, and the like.

The above-described embodiments of the invention are intended to be examples of the present invention and alterations and modifications may be effected thereto, by those of skill in the art, without departing from the scope of the invention which is defined solely by the claims appended hereto.

What is claimed is:

1. An information device for use with a computing device, comprising:
   a memory module including a memory device and an electrical interface to connect the memory device to a complementary interface of a computing device; and
   a housing including a recess in which the memory module can be removably received, a receptacle to receive the electrical interface when the memory module is received in the recess, wherein the memory module and the housing are substantially planar; and
   a planar substrate, wherein the housing is affixed to the planar substrate, the planar substrate affixable to a container, such that the memory module can be removed from the housing when the planar substrate is affixed to the container, the planar substrate comprising printed material on a side opposite the housing, the printed material regarding a product associated with the container.

2. The information device of claim 1, wherein the memory module and the housing can each be at least one of:
   less than about 5 mm thick;
   between about 2.5 and about 8.5 mm thick.

3. The information device of claim 1, wherein at least one of sides of the recess and complementary sides of the memory module comprise at least one retaining mechanism for frictionally retaining the memory module in the recess when the electrical interface is received in the receptacle.

4. The information device of claim 3, wherein the at least one retaining mechanism comprises at least one boss and at least one complementary depression for receiving the boss.

5. The information device of claim 4, wherein the at least one boss is on one of the sides of the recess and the complementary sides of the memory module, and the at least one complementary depression is on the other of the sides of the recess and the complementary sides of the memory module.

6. The information device of claim 4, wherein the recess is defined by two substantially parallel arms comprising the sides of the recess.

7. The information device of claim 6, wherein the sides of the recess comprise the at least one boss, and the complementary sides of the memory module comprise the at least one complimentary depression.

8. The information device of claim 7, wherein each of the two substantially parallel arms is enabled to flex away from the recess, as the boss passes along the complementary side of the memory module before being received in the complementary depression.

9. The information device of claim 1, wherein the at least one retaining mechanism comprises tracks which engage complementary rails.

10. The information device of claim 9, wherein the at least one retaining mechanism further comprises at least one boss at the complimentary rails and at least one complementary depression for receiving the boss at the tracks.

11. The information device of claim 1, wherein the container is enabled to contain a pharmaceutical product, and the printed material comprises information regarding the pharmaceutical product.

12. The information device of claim 1, wherein the printed material is similar to information printed on a side of the container to which the planar substrate is to be affixed.

13. The information device of claim 1, further comprising at least one of an adhesive mechanism for affixing the planar substrate to the container, double sided tape, an adhesive, and an adhesive strip.

14. The information device of claim 1, wherein the memory device includes program steps executed when the memory module is interfaced to the computing device the program steps initiating a web browser session of the computing device and providing a predefined URL to that web browser session to direct the browser session to the predefined URL, wherein the predefined URL is associated with a website associated with at least one of a product and a service associated with the container.

15. The information device of claim 1, wherein the planar substrate is integral with the container.

16. A product information device, comprising:
    a planar substrate, comprising:
        an area for affixing an information device thereto, the information device for use with a computing device, the information device comprising: a memory module including a memory device and an electrical interface to connect the memory device to a complementary interface of a computing device; and a housing including a recess in which the memory module can be removably received, a receptacle to receive the electrical interface when the memory module is received in the recess, wherein the memory module and the housing are substantially planar;
    a side affixable to a container, such that the memory module can be removed from the housing when the planar substrate is affixed to the container; and,
    printed material on a side opposite the housing, the printed material regarding a product associated with the container.

\* \* \* \* \*